United States Patent [19]

Madsen et al.

[11] E Patent Number: Re. 31,841

[45] Reissued Date of Patent: Mar. 5, 1985

[54] ATOMIZER BURNER FOR OIL FIRING PLANT

[75] Inventors: Ingvard M. Madsen, Sonderborg; Niels I. Andersen, Hordborg, both of Denmark

[73] Assignee: Danfoss A/S, Nordborg, Denmark

[21] Appl. No.: 483,725

[22] Filed: Apr. 11, 1983

Related U.S. Patent Documents

Reissue of:

[64] Patent No.: 4,354,822
Issued: Oct. 19, 1982
Appl. No.: 146,795
Filed: May 5, 1980

[51] Int. Cl.[3] ..... F23D 11/44

[52] U.S. Cl. ..... 431/208; 239/135; 219/300; 219/271; 219/301; 219/299; 137/341

[58] Field of Search ..... 431/208.11, 240, 207, 431/209; 219/300, 301, 302, 280, 271; 137/341; 165/DIG. 10; 239/135, 136

[56] References Cited

U.S. PATENT DOCUMENTS

| | | | |
|---|---|---|---|
| 2,974,723 | 3/1961 | Blanchard | 431/240 |
| 3,090,420 | 5/1963 | Sacco | 431/208 |
| 3,975,617 | 8/1976 | Othmer | 137/341 |
| 4,106,891 | 8/1978 | Schladitz | 431/208 |
| 4,177,375 | 12/1979 | Meixner | 219/301 |
| 4,334,141 | 6/1982 | Roller et al. | 219/301 |
| 4,343,988 | 8/1982 | Roller et al. | 219/302 |
| 4,371,777 | 2/1983 | Roller et al. | 219/301 |
| 4,447,706 | 5/1984 | Eder et al. | 431/208 |

FOREIGN PATENT DOCUMENTS

| | | | |
|---|---|---|---|
| 17057 | 10/1980 | European Pat. Off. | 219/301 |
| 2846282 | 5/1979 | Fed. Rep. of Germany | 431/208 |
| 569925 | 11/1975 | Switzerland | 431/208 |

*Primary Examiner*—James C. Yeung
*Attorney, Agent, or Firm*—Wayne B. Easton

[57] ABSTRACT

The invention relates to an atomizer burner assembly for oil burners. The assembly has electric heating apparatus for maintaining a relatively constant temperature for the oil supply over a range of throughputs which may vary for different atomizer nozzles, for example, from 0.5 to 2.5 l/h. The heating apparatus includes a PTC resistor mounted in the supply pipe in series with a near zero temperature coefficient heating element which surrounds the supply pipe at a longitudinal position between the PTC resistor and the atomizer nozzle. The PTC resistor controls the heat generated by the heating element in accordance with the temperature of the throughput oil to maintain a constant temperature for the throughput oil.

12 Claims, 6 Drawing Figures

ATOMIZER BURNER FOR OIL FIRING PLANT

Matter enclosed in heavy brackets [ ] appears in the original patent but forms no part of this reissue specification; matter printed in italics indicates the additions made by reissue.

The invention relates to an atomizer burner for oil firing plant, wherein the oil supply conduit between pump and atomizer nozzle is provided with electric heating means comprising at least one heating resistor.

In a known atomizer burner of this kind, the tubular oil supply conduit is surrounded directly behind the atomizer nozzle by an electric heating device which comprises electric resistor elements. These are to preheat the oil from 60° C. to 120° C. This facilitates atomization. However, the desired temperature can be achieved only for a particular throughput. If the heating device is to be used for a relatively large range of throughputs, for example by selecting different atomizer nozzles between 0.5 and 2.5 l/h, a considerably lower temperature of oil preheating will have to suffice at higher throughputs (DE-OS No. 27 17 171).

Another heating device for a flow medium is known which comprises an electric heating resistor in the form of a cylindrical PTC body. This is surrounded by an insulating layer on the outside and comprises tubes of electrically insulating material on the inside. The intention is to provide automatic regulation which, as a result of the rise in the resistance, prevents overheating on a rise in temperature (U.S. Pat. No. 3,501,619).

It is the problem of the invention to provide an atomizing burner of the aforementioned kind of which the heating means are suitable for larger throughput ranges, e.g. between 0.5 and 2.5 l/h but the outlet temperature of the oil varies within lower limits than hitherto.

According to the invention, this problem is solved in that the heating resistor is a PTC body which extends along the conduit, is narrow in relation to its length and has at least two sides of its surface parallel to its length in heat conductive contact with the outside of wall sections of the conduit.

The use of the PTC body causes the heat output to be adapted to the particular throughflow quantity. Consequently the outlet temperature of the oil is raised at higher throughputs. The PTC body is quite thin and can dissipate heat at least at two sides. This results in comparatively low temperature differences within the body which is therefore not susceptible to temperature fractures as is a PTC body which dissipates heat at only one side and in which temperature differences of 50° to 100° C. can occur. In addition, the entire cross-section of the PTC body can be held at a relatively low temperature; the stream flowing through is correspondingly large with a consequent high power output. This, again, is particularly favourable at elevated quantities of throughflow. Since the PTC body lies against the outside of the conduit, the use of an insulating conduit or the interpositioning of insulation between the body and the conduit will ensure that the oil will not become live.

It is advantageous for the PTC body to have the shape of a rectangular plate and the wall sections of the conduit to lie against at least the two largest faces of the plate. In this way contact between the wall sections and the conduit and production of the body itself can be brought about much more simply than if one were to use a hollow cylindrical body.

The parts of the conduit located near the heating means should have two wall sections parallel to the largest faces of the plate. Their spacing can be selected so that all oil particles are subjected to an adequate heating effect.

In one embodiment of the invention, the conduit comprises two parallel branches near the heating means, each abutting one side of the plate. This gives a very simple construction.

Another possibility is for the conduit to have a U-shaped cross-section near the heating means, with the plate disposed between the limbs of the U. In this case a third surface of the plate can additionally be utilised for heat transfer.

In another favourable embodiment, in which the conduit has a comb-like cross-section with at least three prongs near the heating means, at least two plates are disposed between respective two adjacent prongs. This permits very intensive heating to be achieved.

With particular advantage, the conduit is filled near the heating means with a packing of good heat conductive members. These improve the heat transfer over the entire cross-section of the conduit. In addition, they give rise to a multitude of flow deflections to result in very uniform heating of the oil. In conjunction with the use of a PTC body, this likewise leads to still more intensive heating at the upper range of throughputs.

More particularly, the packing may consist of metal balls. Metal balls of filter bronze have proved particularly suitable. To obtain good heat transfer from the wall of the conduit to the balls and from one ball to another, the balls may be compressed by deforming a pipe forming the conduit or they may be sintered together within the pipe.

A still further improvement in keeping the temperature constant is achieved in that a heating resistor substantially unresponsive to temperature is electrically connected in series with the PTC body, is disposed downstream of the PTC body and has a resistance of the same order as the cold resistance of the PTC body. Resistances between 50 and 200% of the cold resistance are advisable. The power output of the resistance unresponsive to temperature is regulated by the PTC body in such a way that there is a considerably higher power input in the upper range of throughput quantities.

PTC solid bodies with a Curie point of about 100° to 110° C. have proved particularly suitable. On the one hand, these suffice to give the oil the required temperature of about 80° ± 10° C. However, the highest temperature occurring when the oil is at a standstill is not sufficient to cause coking.

The invention will now be described in more detail with reference to examples shown in the drawing, wherein:

FIG. 1 diagrammatically illustrates an atomizing burner according to the invention;

Figure 1:
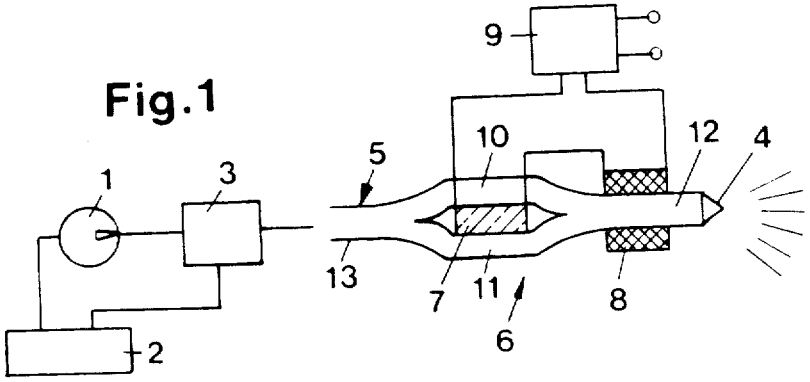

According to FIG. 1, a pump 1 feeds oil from a tank 2 through a pressure regulating device 3 into a conduit 5 serving to supply oil to an atomizing nozzle 4. The conduit is associated with electric heating means 6 just in front of the atomizer nozzle. The heating means comprise a series circuit of a temperature responsive heating resistor in the form of a PTC solid body 7 and a heating resistor in the form of a heating coil 8 which is unresponsive to temperature. The heating coil 8 is disposed downstream of the PTC body 7. Both heating resistors are energized at a constant voltage by a control device 9. The PTC body 7 is disposed between two branches 10 and 11 of the conduit 5. The coil 8 surrounds an end section 12 of the conduit 5 that is tubular, as is the starting section 13 of this conduit.

Figure 2:
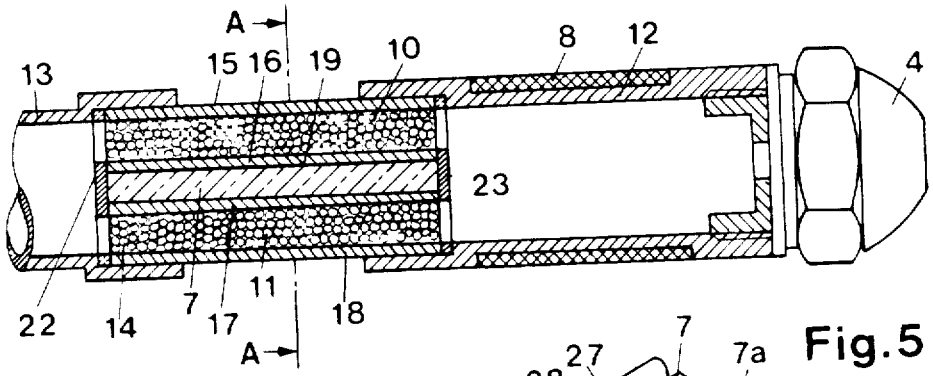
FIG. 2 is a longitudinal section through one embodiment of the invention.
Figure 3:
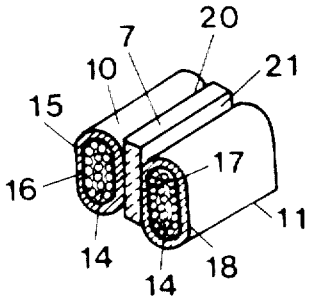
FIG. 3 is a pictorial view of the part of the heating means having the PTC body which is sectioned in the plane A—A in FIG. 2.

FIGS. 2 and 3 show that the two branches 10 and 11 are filled with a ball packing 14 composed of filter bronze balls. They are two copper tubes with parallel side walls 15, 16 and 17, 18, respectively, of which the side walls 16 and 17 abut the largest faces 20, 21 of the PCT body 7 with an interposed thin insulating layer 19 so as to give a good thermal contact. The conduit portions 12 and 13 engage over the branches 10 and 11 with interposed sealing discs 22 and 23. The nozzle 4 is screw-connected into the conduit portion 12.

Figure 4:
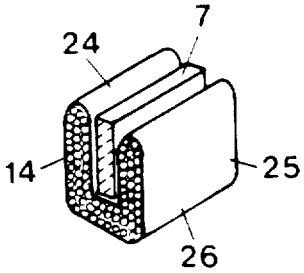
FIG. 4 shows a similar view of a modified embodiment.

In the FIG. 4 embodiment, a PTC solid body 7 is disposed between the two limbs 24 and 25 of a conduit portion 26 of U-shaped cross-section.

Figure 5:
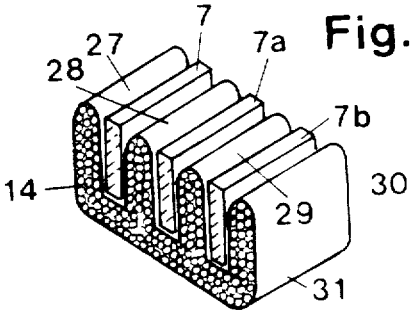
FIG. 5 is a similar view of a further embodiment.

In the FIG. 5 embodiment, three PTC solid bodies, 7, 7a and 7b are disposed between four prongs 27, 28, 29 and 30 of a conduit portion 31 having a comb-shaped cross-section.

In all cases it is ensured that a PTC body in the form of a rectangular plate can dissipate heat at least at two sides to parts of the oil supply conduit 5. The connecting electrodes may be applied in known manner, for example at the largest faces or at the two end faces. In one embodiment, the PTC body had a length of 50 mm, a thickness of 2 mm and a height of 8 to 9 mm. The insulation was of insulating plastics material and had a thickness of 60$\mu$. The Curie temperature amounted to 100° C.

Figure 6:
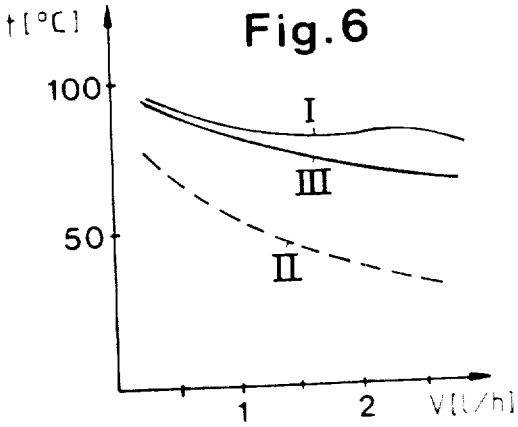
FIG. 6 is a graph of the output temperature t of the oil against the volume V of throughflow.

According to FIG. 6, with the series circuit of the PTC body 7 and a heating coil 8, a temperature curve I was obtained at which the outlet temperature of the oil is between 90° C. and 75° C. when the throughflow volume V is changed between 0.5 and 2.5 l/h. The slight rise in the curve at the higher throughputs is accounted for by the fact that the Curie point is reached and fallen short of. The broken curve II shows which proportion of the temperature increase is accounted for by the PTC body 7. The part disposed between the curves therefore shows that temperature increase which is accounted for by the heating coil 8.

The curve III at which the outlet temperature t of the oil fluctuates by less than $\pm 10°$ C. about a mean value at 80° C. is obtained when using a PTC body which alone is instrumental for heating.

The heating means could also be equipped with a hollow cylindrical PTC body, an inner branch of the oil conduit having a circular cross-section and an outer branch an annular cross-section. Instead of using a metal pipe and insulation, one can also use a pipe of insulating material.

What is claimed is:

1. An atomizer burning assembly for an oil burner comprising, conduit means providing a conduit for transporting a fluid, said conduit means having internal wall surface means contactable by said fluid and external wall surface means isolated from said fluid, an atomizer nozzle attached to the outlet end of said conduit means, electrical circuit means including power means connected in series with a heating element and a PTC resistor element, said elements being in heat transmitting contact with said external wall surface means with said PTC resistor element being upstream relative to said heating element to control the heat generated by said heating element in accordance with the temperature of said fluid to maintain a substantially constant temperature for said fluid.

2. The atomizer burner assembly in claim 1 wherein said PTC resistor element has a flat and elongated rectangular shape with the flat sides thereof in contact with said external wall surface means.

3. The atomizer burner assembly in claim 2 wherein said external wall surface means has flat surfaces in contact with said flat sides of said PTC resistor element.

4. The atomizer burner assembly in claim 2 wherein said conduit means comprises two parallel branches each adjacent one of said flat sides of said PTC resistor element.

5. The atomizer burner assembly in claim 1 wherein said conduit means has a U-shaped cross section with said PTC resistor element being disposed between the limbs thereof.

6. The atomizer burner assembly in claim 1 wherein said conduit means has a comb shaped cross section with at least three projecting groups and said PTC resistor element being articulated and having one less nesting prong than the number of said projecting prongs, said resistor nesting prongs being respectively disposed in the spaces between said prongs.

7. The atomizer burner assembly in claim 1 wherein said conduit means are packed with efficient heat conductive members.

8. The atomizer burner assembly in claim 7 wherein said heat conductive members are metal balls.

9. The atomizer burner assembly in claim 8 wherein said metal balls are of filter bronze.

10. The atomizer burner assembly in claim 1 wherein said heating element has a substantially zero temperature coefficient.

11. The atomizer burner assembly in claim 1 wherein said PTC resistor element has a Curie point in the approximate range of from 100° C. to 110° C.

*12. An atomizing burner for an oil firing plant comprising fluid conduit means having an inlet and an outlet linearly displaced relative to each other, an atomizer nozzle, means connecting said nozzle and said outlet forming a liquid oil chamber therebetween for providing fluid communication between said nozzle and said outlet, elongated rectangularly shaped PTC heating resistor means in said conduit means between and linearly aligned with said inlet and said outlet, said PTC resistor means having a pair of parallel sides of greater width than the thickness of said resistor means, electrodes connected to said sides, power means connected to said electrodes, said conduit means having heat transfer means for transferring heat from said PTC resistor means to oil flowing in said conduit means, said heat transfer means including flattened parallel conduit sections sandwiching said PTC resistor means therebetween and being in effective heat transmitting relation to said PTC resistor means parallel sides, said parallel conduit sections having unimpeded cross sections to facilitate the flowing of oil uniformly therethrough, and said parallel conduit section being packed with efficient heat conductive means with the form of metal balls.*

* * * * *